United States Patent [19]

Murakami

[11] Patent Number: 6,026,181
[45] Date of Patent: Feb. 15, 2000

[54] IMAGE PROCESSING APPARATUS

[75] Inventor: Yoshinori Murakami, Yamatokoriyama, Japan

[73] Assignee: Sharp Kabushiki Kaisha, Osaka, Japan

[21] Appl. No.: 08/965,785

[22] Filed: Nov. 7, 1997

[30] Foreign Application Priority Data

Dec. 25, 1996 [JP] Japan .................................. 8-344879

[51] Int. Cl.[7] ..................................................... G06K 9/00
[52] U.S. Cl. .......................... 382/168; 382/169; 382/171; 358/455; 358/462; 358/464
[58] Field of Search ..................... 382/168, 169, 382/171, 172, 176; 358/455, 456, 458, 462, 464

[56] References Cited

U.S. PATENT DOCUMENTS

| 4,962,433 | 10/1990 | Matsushima et al. | 358/455 |
| 5,748,773 | 5/1998 | Tashiro et al. | 382/169 |
| 5,831,748 | 11/1998 | Tsukada et al. | 358/455 |
| 5,953,450 | 9/1999 | Kanamori | 382/171 |

FOREIGN PATENT DOCUMENTS

| 0557099A1 | 2/1993 | European Pat. Off. . |
| 5236277 | 9/1993 | Japan . |

Primary Examiner—Thomas D. Lee
Attorney, Agent, or Firm—David G. Conlin; David A. Tucker

[57] ABSTRACT

An image signal representing the data picked up from an original is input from the input terminal and stored in the memory. A feature data extracting circuit produces a density value histogram showing the number of pixels (distribution frequency) with respect to density level in accordance with the image data stored in the memory. The feature data extracting circuit extracts the modal density value 1p and a quotient per1 which is obtained by dividing the number of pixels relating to this density value 1p by the total number of pixels used for preparation of the histogram, as feature data for recognizing the features of an original. From these two pieces of feature data, the original is recognized as text, photography or other features, and based on a density correction table selected in accordance with the recognition, a density correcting circuit performs density correction of the input image signal to output the result from the output terminal.

9 Claims, 10 Drawing Sheets

IMAGE PROCESSING APPARATUS

SPECIFICATION

BACKGROUND OF THE INVENTION (1) Field of the Invention

The present invention relates to an image processing apparatus which is used in digital copiers, scanners, etc., and which effects optimal density correction to the image data scanned from an original, in conformity with the features of the original.

(2) Description of the Prior Art

Conventionally, digital copiers and scanners scan the image of an original using a CCD (charge coupled device), image sensor etc., and effect various image processings to the image data obtained by the scanning operation in order to improve the quality of the recorded image which will be reproduced from the image data.

The image processing for the purpose of improving the recorded image includes an operation for optimal correction of density in conformity with the features of the scanned original. For example, when an original of newspaper etc. is scanned, a density correction for deleting the gray tone of the background and the image of text on the reverse side will be performed in order to improve the visual appearance of the reproduced image, thus providing improved images for viewers. It is also well known that when an original drawn in pencil etc. is scanned, its density is corrected so as to enhance thin text so that the reader can easily recognize the reproduced image.

One example of such methods of density correction has been proposed in Japanese Patent Application Laid-Open Hei 5 No.236,277 'an image processing apparatus'. This disclosure proposes a method of density correction to the image data which comprises the steps of preparing histograms from the image data (image signal) picked up from the original, analyzing the features (the lightest level, the darkest level, the modal point of the distribution, the level at the modal point, etc.) to identify the features of the original, transforming the output levels of the image data depending upon the transformation table prepared in accordance with the feature information.

However, in accordance with the image processing apparatus of performing density correction disclosed in Japanese Patent Application Laid-Open Hei 5 No.236,277, if it is applied to a digital copier, the original needs to be pre-scanned before the actual scanning of the image data, resulting in slow operation of the image processing. Otherwise, if the original is attempted to be identified exactly without performing the pre-scanning, a large capacity of storage for storing the image data of the original is needed.

Density transforming tables are prepared in association with the types of originals, by recognizing the type of an original based on threshold processing analysis of the feature data of the original. However, the threshold processing analysis is not enough to precisely identify the type of original, so that it is difficult to produce a density transforming table which reflects the detail of the characteristics of the feature data of the original.

As a result, it is impossible to exactly classify all types of originals and perform density correction based on the features of the original, thus possibly causing degradation of the recorded image for some types of originals.

SUMMARY OF THE INVENTION

The present invention has been achieved in order to solve the above problems, and it is therefore an object of the invention to provide an image processing apparatus which can exactly recognize the features of an original by a simple technique and can perform density correction in accordance with the image of the original based on the recognition.

In particular, an object of the invention is to provide a simple means of exactly and precisely recognizing the features of an original.

It is another object of the invention to allow the input image data to be density-corrected line by line.

The present invention has been achieved to attain the above objects and the gist of the invention is as follows:

In accordance with the first aspect of the invention, an image processing apparatus includes:

a feature data extracting means which extracts feature data representing the density characteristics of an original from the image data that has been obtained by scanning the original and recognizes the features of the original from the feature data thus extracted; and a density correcting means which has a plurality of density correction tables for transforming the density values of the image data of the original into corrected density values in accordance with the features of the image of the original, and selects one density correction table from the density correction tables, based on the image recognition information of the original from the feature data extracting means, and performs density correction of the image data in conformity with the selected density correction table, and is characterized in that the extracted feature data is composed of the modal density value (1p), at which the distribution frequency in the image density value histogram becomes maximum, and a quotient (per1) of the number of pixels relating to the modal density value, and based on the feature data, the feature data extracting means identifies the features of the original.

Next, the second aspect of the invention resides in the image processing apparatus having the above first feature, wherein the feature data extracting means produces a density value histogram from the image data of a single line or a plurality of lines located before or after the line of image data to be density-corrected, and extracts a density value (1p) and a quotient (per1) as the feature data from the produced histogram so as to identify the features of the original.

The third aspect of the invention resides in the image processing apparatus having the above first feature, wherein the feature data extracting means produces a density value histogram of the image data of a line to be density-corrected, and extracts the modal density value (1p) and a quotient (per1) relating thereto based on the produced histogram so as to recognize the features of the original, and selects a density correction table based on the cognition result, and the density correcting means effects density correction of the image data of the line to be density-corrected based on the selected density correction table.

Further, the fourth aspect of the invention resides in the image processing apparatus having the above first feature, wherein the selection of a density correction table in the density correcting means is made based on the extracted feature data and the density correction table for the previous line which has been density-corrected.

Moreover, the fifth aspect of the invention resides in the image processing apparatus having the above first feature, wherein in extraction of the modal density value in the produced density value histogram of an image, the feature data extracting means extracts a density value occurring most frequently in the density value histogram, from a range having density values more than a certain density value.

Finally, the sixth and seventh aspects of the invention reside in the image processing apparatuses having the above first and fifth features respectively, wherein an averaged density value histogram produced from the originally obtained density value histogram of the image is used in the feature data extraction means when it extracts the density value occurring most frequently, the modal density value.

In accordance with the above configurations of the invention, which use only two pieces of feature data, it is possible to readily select one density correction table reflecting the features of an original, based on simplified criteria. Therefore, the architecture can be markedly simplified so that it becomes possible to effect density correction during the operation of reading an original.

In the configuration of the above image processing apparatus, the density histogram is produced for a line of image data to be density-corrected by evaluating the image data of predetermined lines located before and after the line of image data. During this operation, histograms for the lines before and after the line to be corrected or reflecting the featured conditions of the images before and after the line to be corrected can be produced, so this simplifies the processing. In particular, it is possible to enhance the speed of processing up to the extraction of the feature data.

Besides, it is possible to recognize the features of the original even when the density value histogram is produced only from a single line before or after the line of image signal to be corrected. Accordingly, it is possible to enhance the processing speed as well as markedly reduce the capacity of the memory in which the image data is stored. It is also possible to directly perform density correction of the input image data and output it. As a result, in digital copiers, it is no longer necessary to effect reading of an image by a preliminary scanning of an original.

Further, in the extraction of the modal density value from the density value histogram, as the feature data, it is also possible to extract a density value at which the distribution frequency in the density value histogram becomes maximum within the range of density values greater than a certain value. This setting of the condition, not only lends itself to contributing shortening of time for identifying the modal density value, but also reduces the burden of operation and hence markedly increase the processing speed because the search target is limited to the density values above the definite density value.

Moreover, when the modal density value is determined in the density value histogram which has been obtained by averaging the distribution frequencies in its original density value histogram, it is possible to reduce the number of relative maximum or peaks of distribution frequencies due to errors, and hence it becomes possible to appropriately extract a typical density value representing the background area of the original.

DESCRIPTION OF THE PREFERRED EMBODIMENTS

The embodiments of the invention will hereinafter be described with reference to the accompanying drawings.

Figure 1:
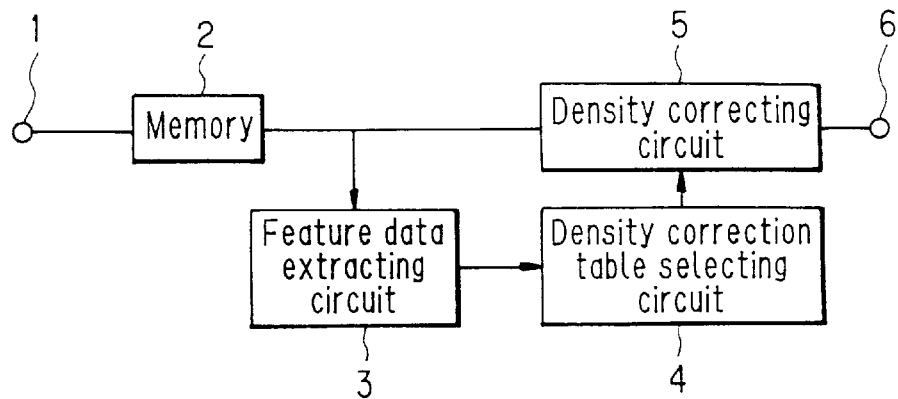
FIG. 1 is a block diagram showing the schematic configuration of an image processing apparatus in accordance with the invention.

FIG. 1 is a block diagram showing a schematic circuit configuration of an image processing apparatus in accordance with the invention. The image processing apparatus of this invention shown in FIG. 1 comprises: an input terminal 1 for receiving image data (image signal) picked up by a digital copier, scanner etc.; a memory 2 for storing the image data from the input terminal as required; a feature data extracting circuit 3 for extracting the feature data of the original from the image data stored in the memory; a density correction table selecting circuit 4 for selecting a density correction table for effecting density correction of the image data; a density correcting circuit 5 for density-correcting the image data based on the density correction table selected in the density correction table selecting circuit 4; and an output terminal 6 for outputting the density correction from the density correcting circuit 5, or corrected image data obtained from the image processing.

Referring further to the constituents of the circuit configuration shown in FIG. 1, the principle of the density correcting process of the invention will be described in accordance with the procedural steps of the image density correction shown in FIG. 2.

The aforementioned memory 2 has a storage area for storing the input image data from input terminal 1 at 256 (8 bit) pixel levels. Feature data extracting circuit 3 produces a density value histogram from the input image data from input terminal 1, i.e., the image data acquired through memory 2, and extracts feature data based on this result. In this case, when a digital copier or a scanner which executes a pre-scanning operation is used, it is possible to omit memory 2 because the image data to be corrected in its density will be input again from input terminal 1.

Figure 3:
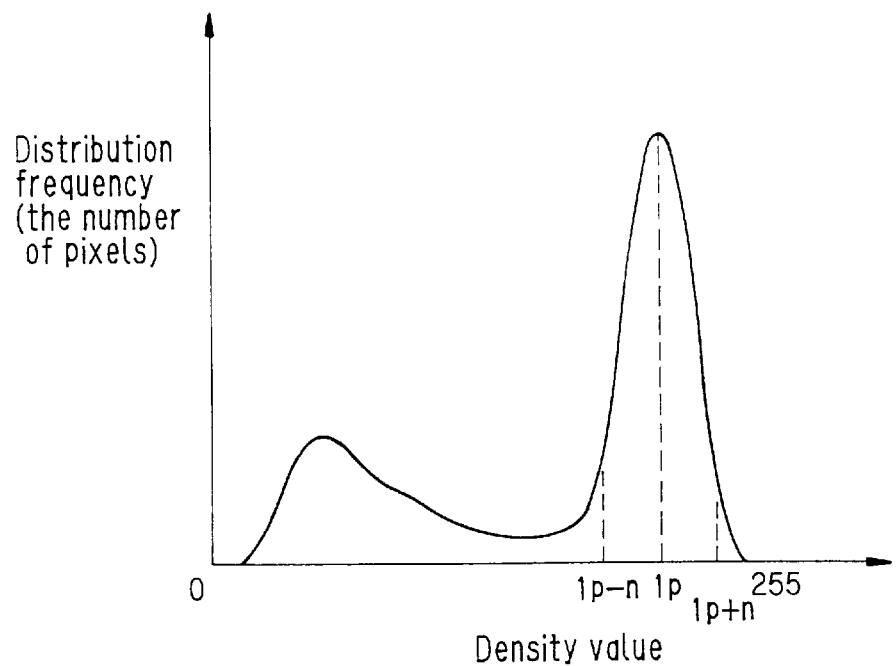
FIG. 3 is an illustrative chart showing an example of a density value histogram of a typical image of a text original with a white background.

The histogram referred to here is a graph which, as shown in FIG. 3, represents the features of the image by plotting a distribution frequency (the number of pixels) in height (along the ordinate) with respect to the levels of the image signal (the density values) taken along the abscissa. In this specific case, the density value '0' corresponds to the darkest level (black) and '255' corresponds to the lightest level (white), so that the density value for every pixel of the input image data is classified into 0 to 255 levels of density, and the number of occurrences for each level is determined by sequential additions to provide a histogram shown in FIG. 3.

FIG. 3 is an example of a histogram obtained for a text original with a white background. Since a text original is composed of the text portion and the background portion having large difference in density from one another, the histogram presents a bimodal (twin peaked) shape in which the distribution frequencies become greater at the lightest region and at the darkest region as seen in FIG. 3.

Figure 4:
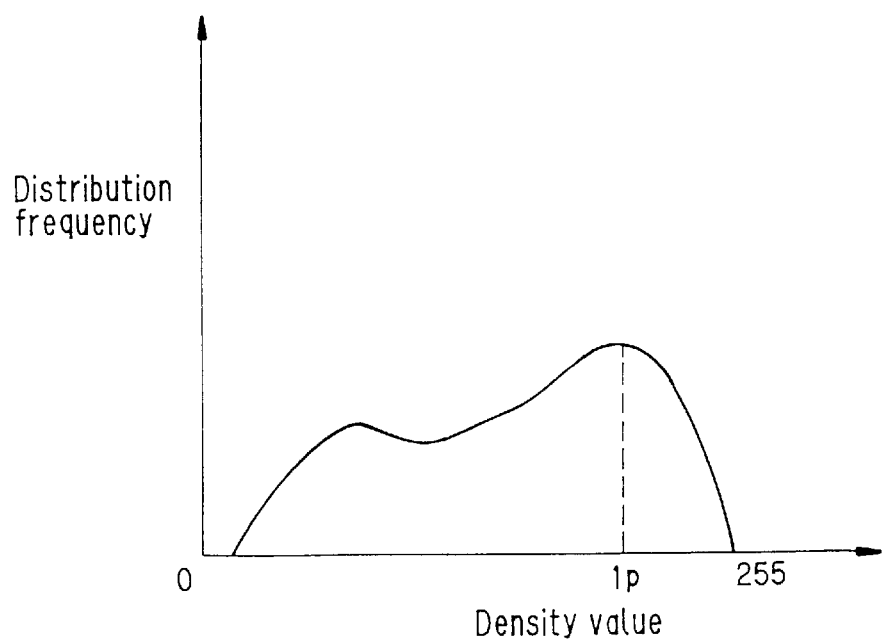
FIG. 4 is an illustrative chart showing an example of a density value histogram of a typical image of a photographic original.

FIG. 4 is an example of a histogram for a photographic original. Since most of a photographic original image is composed of medium tonal portions having gentle variations in density, the histogram presents a shape as shown in FIG. 4, which is closer to a single modal shape than that of a text original.

Figure 5:
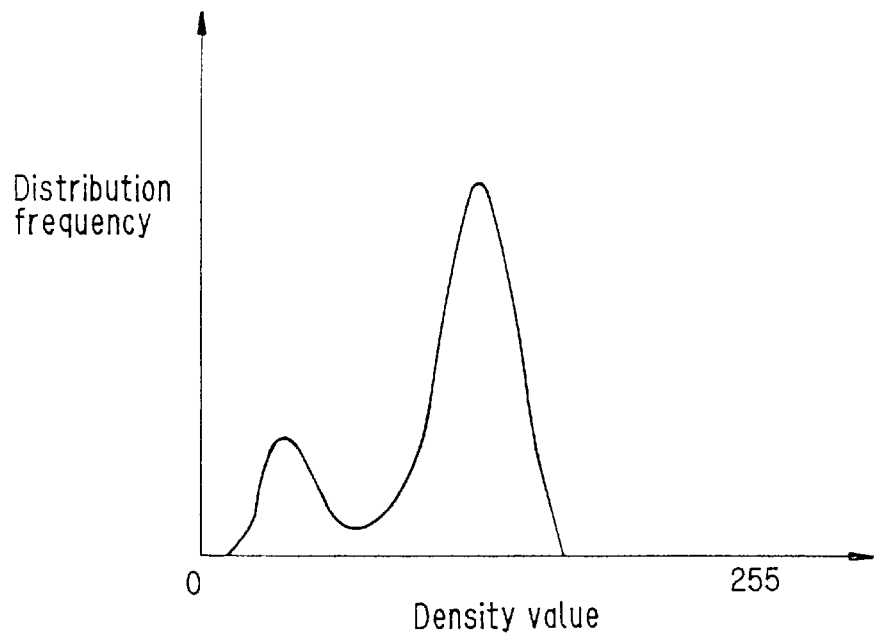
FIG. 5 is an illustrative chart showing an example of a density value histogram of a typical image of an original with a colored background.

Further, FIG. 5 is an example of a histogram for a text original with a colored background such as newspaper, green, blue, yellow or other colored paper. A colored background original has a lower density value in the background portion compared to that of a text original with a white background. Therefore, as seen in FIG. 5, the histogram for a colored background original shows a distribution in which the distribution frequencies of the pixels existing in its lightest portion are shifted to the medium tonal side as compared to the histogram for a text original with a white background.

Figure 2:
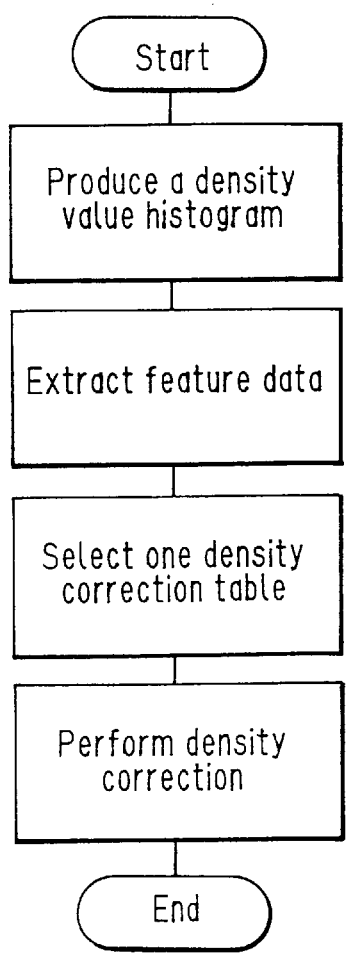
FIG. 2 is a flowchart showing the principle of a density correction process in the image processing of the invention in the image processing apparatus of FIG. 1 and showing the flow of the density correction process.

Accordingly, as stated above, in the first step of the process in FIG. 2, density value histograms, as shown in FIGS. 3 through 5, are prepared based on the input image data. From the density value histogram thus prepared, characteristics or features of the original can be recognized.

However, since the histogram contains a large amount of data in its original state, in this invention two pieces of feature data will be extracted from the density value histogram. This corresponds to the second step in FIG. 2, the extraction of feature data.

First, it is assumed that the original to be density-corrected includes a background area. It also is assumed that a density value 1p at which the distribution frequency of the density value histogram becomes maximum (peak) is extracted as a typical density value which is believed to represent the background as shown in FIG. 3. In this case, density value 1p showing the largest peak is high (which relates to a high degree of whiteness), so that the original can be recognized as a text original made up of a white background sheet.

The other data extraction method is used to recognize whether the original is photographic or not. For this purpose, the ratio of the number of the image data corresponding to the background area to the total number of the image data is extracted as feature data. Specifically, the number of image data having a density value within the range of 1p±n (the density at the maximum frequency (the maximum peak) n) is divided by the total number of the image data stored in memory 2 (the total number of pixels presenting density values), and the obtained quotient is taken as the feature data 'per1'. This quotient 'per1' can be calculated from the following formula (1):

$$per1 = \sum_{k=1p-n}^{1p+n} hist[k] \bigg/ \left(\sum_{k=0}^{255} hist[k]\right) \quad (1)$$

where hist[k] represents the histogram frequency at a density value k.

If the thus calculated value 'per1' is small, the original is recognized as a photographic one. That is, a text original has a large number of pixels having a density value around the maximum peak density value 1p (ranging from 1p−n to 1p+n). In this respect, although a photographic original has a maximum peak, the number of pixels at the maximum peak is smaller than that in the text original, as understood from FIG. 4. Therefore, the value 'per1' is small. In this way, it is possible to definitely recognize a photographic original.

In the above formula (1), the denominator, i.e., the total number of pixels means the total number of pixels when the density value histogram was prepared. As for 'n', this value is set up within the range of, for example, 10 to 25, in terms of the density value level.

In the above case, it is also possible to simply use the number of pixels at the maximum peak density value 1p as the numerator in the formula (1) for determining the above quotient 'per1', instead of using the number of pixels residing around the maximum peak density value 1p or within the range of 1p±n.

As has been described, a text original with a white background has a greater density value of '1p' than a photographic original or a colored background original, while a photographic original has a smaller value of 'per1' than a text original or a colored background original, these values allow the features of an original to be easily recognized. Further, concerning a colored background original, its peak density value 1p is smaller than that of a text original, and the quotient 'per1' as the feature determined by formula (1) is greater than that of a photographic original, a colored background original can be clearly distinguished from photographic originals and text originals. Thus, the extraction of these two features enables simple and precise recognition.

In this invention, feature data extracting circuit 3 extracts the two features as stated above. Based on the extracted pieces of feature data, one of the density correction tables corresponding to text originals, photographic originals or colored background originals, will be selected in density correction table selecting circuit 4. This corresponds to the third step in FIG. 2, the selection of a density correction table.

Figure 6:
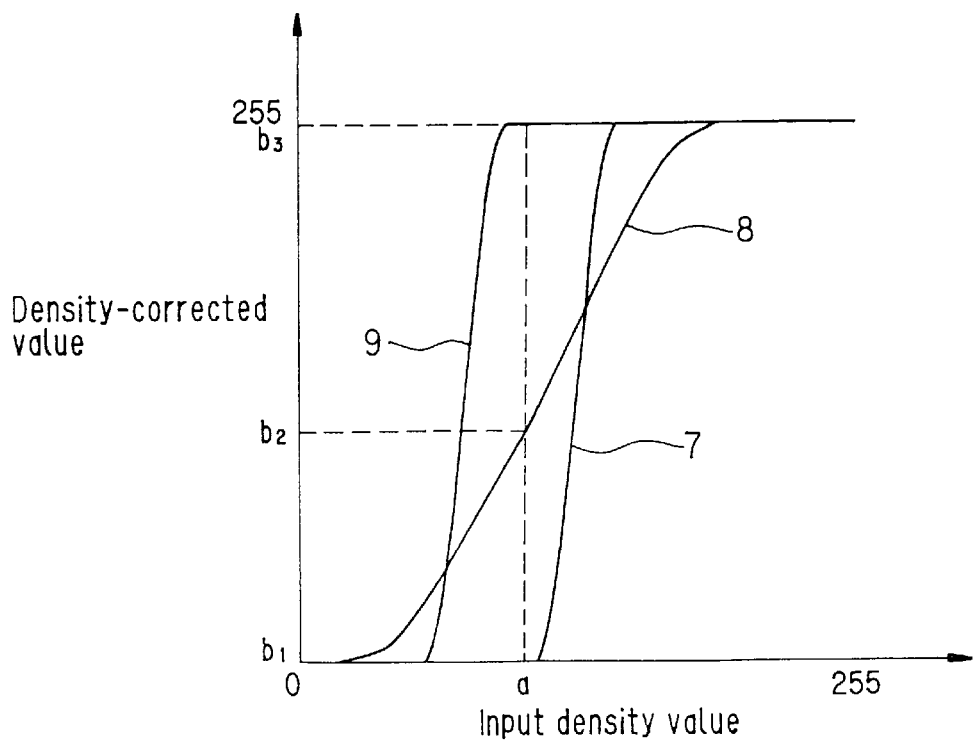
FIG. 6 is a chart showing an example of density correction tables to be used in a density correcting circuit provided in the image processing apparatus shown in FIG. 1.

FIG. 6 is an example of the density correction tables. In FIG. 6, reference numerals 7, 8 and 9 designate density correction tables: in particular, 7 designates a table for text originals, 8 for photographic originals and 9 for colored background originals. As stated before, based on the two features extracted in feature data extracting circuit 3, one of correction tables 7 to 9 is selected in density correction table selecting circuit 4. In this selection, when the target original is recognized as a photographic one in accordance with the process described above, correction table 8 will be selected.

As stated above, based on the extracted feature data, the characteristics or features of the original are recognized, whereby one of density correction tables 7 to 9 is selected. Then, density correcting circuit 5 effects density correction of the input image data in accordance with the density correction table thus selected. This corresponds to the final step in FIG. 2, the density correction process. That is, density correcting circuit 5, based on the correcting table selected in FIG. 6, outputs the corrected density value shown as the ordinate value with respect to the density value of the input image data.

For example, when the density value of the input image data (pixel) is 'a' in FIG. 6, density correcting circuit 5 outputs a corrected density value of 'b2' in the state where the original is recognized as a photographic one and hence table 8 is selected. In this case, when the original is recognized based on the feature data, as a text original, density correction table 7 is selected. Based on this, circuit 5 outputs a corrected density value of b1, i.e., black ('0') for input image density value 'a'. When the original is recognized as a colored background original and hence table 9 is selected, circuit 5 outputs a corrected density value of b3, i.e., white ('255').

The above correction of density values enables clear distinction between text from the background in a text original. Therefore, it is possible to output corrected data which can clearly represent image areas, more specifically, reproduce clear text. In the case of photographic originals, the input data is density-corrected in conformity with the input density values, so that the corrected output will be rich in mid-tones.

As stated above, in accordance with the image processing apparatus of the invention, it is possible to precisely distinguish, based on the two pieces of feature data, the target original as a text original, a photographic original, or an original with a colored background such as newspaper green, blue or yellow or other colored paper. Further, based on the result of the recognition, the apparatus of the invention is able to select one of the correction tables 7 to 9 for the respective original types, and perform density correction on the basis of the selected correction table.

Next, a variety of specific examples which use the above principle of the image density correction of the invention will be described by exemplifying the procedures of extracting the feature data for actual input image data and selecting one table for density correction based on the extracted feature data.

First embodiment

Figure 7:
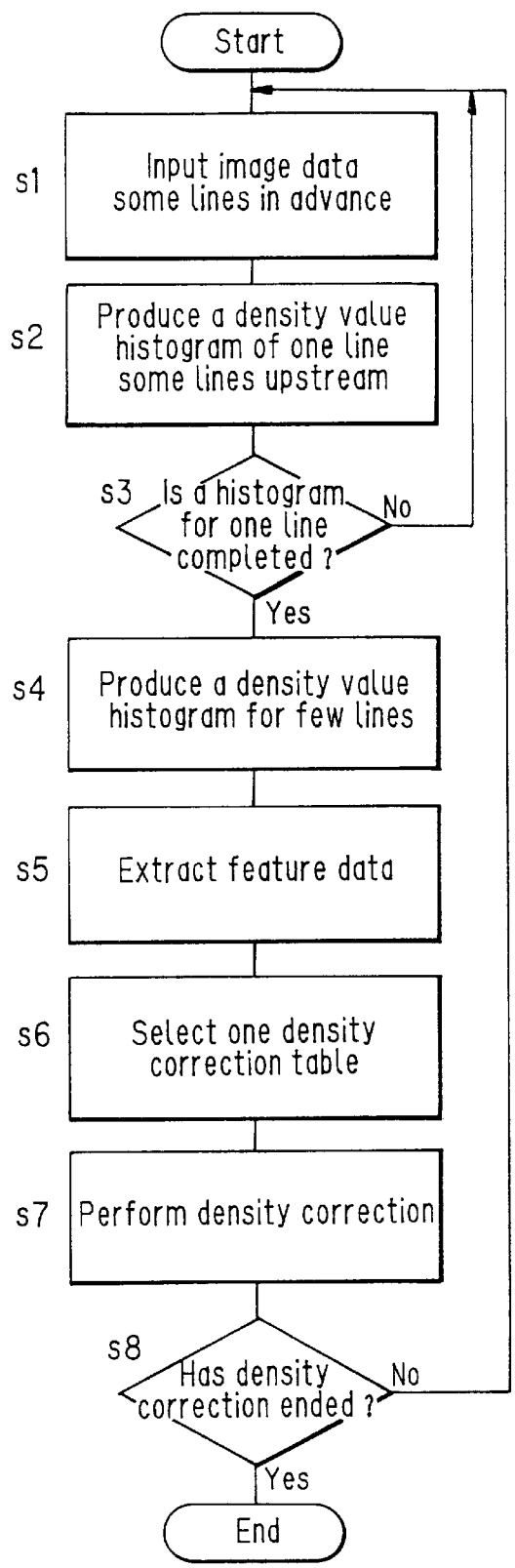
FIG. 7 is a flowchart showing a mode of the density correction process of the image processing apparatus in the first embodiment of the invention.

The first embodiment is a mode for improving the quality of image by using the density correcting process in the above-described image processing apparatus, and will be described in accordance with the control flow of the flowchart shown in FIG. 7. FIG. 7 shows procedural steps for extracting two features from the input image data (image signal) shown in FIG. 1 and effecting the density correction thereof.

First, the image data is adapted to, at any time, be supplied from input terminal 1 with some lines of data upstream of the line which is to be currently corrected, in order to allow a density value histogram to be produced. Memory 2 stores the image data from the line being currently corrected along with the previous lines which have been input in advance (Step s1). Feature data extracting circuit 3 produces a histogram for each line, in order to extract two features based on the density value histogram of the line to be density-corrected and the lines therearound, especially the image data of the surrounding lines upstream of the line to be corrected (s2).

If the density value histogram for one line has not been completed, the production of the histogram will continue (s3→s1), and if the density value histogram for one line has been completed, production of the density value histogram for the next few lines will be started (s4).

This density value histogram can be produced by adding up the distribution frequencies of the density value histograms produced line by line, with respect to the density values (s4).

Then, in the next step, when the histogram for a group of lines including the line being currently density-corrected and those before and after it, has been produced, feature data extracting circuit 3 extracts the two pieces of the feature data 1p and per 1 (s5). Feature data 1p can be determined as the density value at the maximum peak based on the produced density value histogram. The other piece of feature data, i.e., per1 can be determined easily based on the first feature data 1p using formula (1).

When the aforementioned step is over, density correction table selecting circuit 4 selects one table from a multiple number of the density value correction tables shown in FIG. 6, based on the two pieces of feature data extracted in step s5. In this case, it is also possible to select one density correction table with reference to the density correction table which was selected for the line directly before the line being currently corrected (s6).

After the determination of a density correction table, density correcting circuit 5 effects density correction of the image data of one line using the selected density correction table (s7). For example, based on one of the correction tables 7 to 9 shown in FIG. 6, density correction is carried out.

It is better to prepare a multiple number of density correction tables, including the three density correction tables 7 to 9 shown in FIG. 6: for example, and in addition to the above three, tables having the same shape but with their center shifted to the left and right sides from the above three tables, and several tables for photographic originals with their gradients varied. When the pair of feature data 1p and per1 fall within the range in which the image is recognized as a text area, the selection of a density correction table for the current line is carried out by selecting the density table which is the closest one to the density correction table for the previous line, among the group of density correction tables having more defined text features than the density correction table for the previous line.

On the other hand, when the pair of feature data 1p and per1 fall within the range in which the image is recognized as a photographic area, the selection of a density correction table for the current line is carried out by selecting the density table which is the closest one to the density correction table for the previous line, among the group of density correction tables having more defined features for photographic area than the density correction table for the previous line.

Further, when the pair of feature data 1p and per1 fall within the range in which the image is recognized as that in a colored background area, the selection of a density correction table for the current line is carried out by selecting the density table which is the closest one to the density correction table for the previous line, among the group of density correction tables having more defined features for colored background area than the density correction table for the previous line.

Here, when the extracted feature data 1p and per1 fall within the range in which the data is not distinct enough to determine which area the current line belongs to, the same density correction table as that for the previous line may be selected as the density correction table for the current line.

In this way, density correction is carried out based on the image data of each line, and if density correction for all the lines has not been completed, the operation returns from s8 to s1, to continue the aforementioned processing.

In the above operation, when the image data of the first line is input, it is impossible to obtain a density value histogram taking into account a plurality of its surrounding lines. Therefore, from the first line to a prescribed number of lines, features may be extracted from the histogram for the first one line, and the table for density correction may be selected based on this. It is also possible to effect density correction of the first line as follows: storing the image data of the subsequent plurality of lines in memory 2, creating a density value histogram for the image data up to a prescribed number of lines, extracting feature data 1p and per1 from the created density value histogram, and correcting the image data for the first line based on the extracted feature data. In this method, the correction output for the first line is delayed to some degree until a prescribed number of lines have been processed, but this delay will have little general effect.

As a result, in accordance with the image process in FIG. 7, in particular the density correction process, it is possible to take into account the information of the image data for a multiple number of lines around each line. This characteristic enables pertinent recognition of features of each line and allows a proper selection of a density correction table for each line, thus making it possible to effect appropriate density correction for each line.

Figure 8:
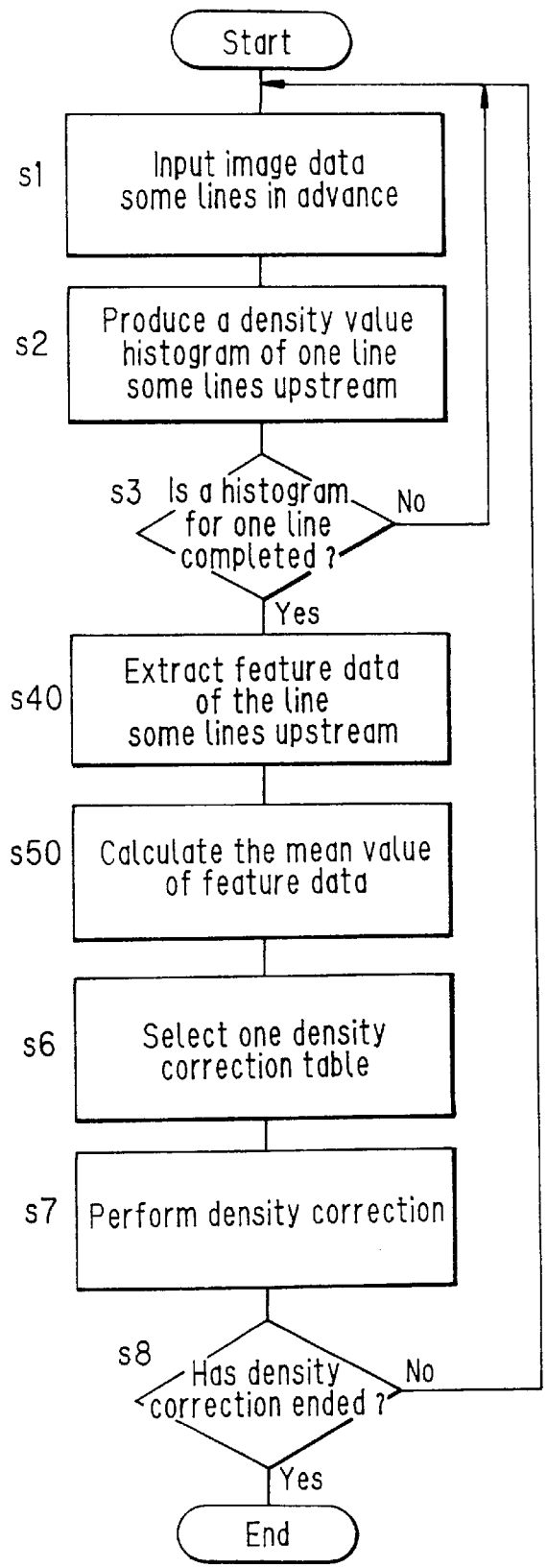
FIG. 8 is a flowchart showing another mode of the density correction process of the image processing apparatus in the first embodiment of the invention.

A variational embodiment of the image processing shown in FIG. 7 above will be described. FIG. 8 is a flowchart showing the variational example. The difference from those in FIG. 7 resides in steps s4 and s5. Other steps are the same.

Illustratively, the image data is adapted to always be supplied from input terminal 1 some lines upstream of the line which is to be currently corrected, in order to allow a density value histogram to be produced, and this is stored in memory 2. Thus, a density value histogram for each line is successively produced (s1 and s2). When a density value histogram for each line is completed, feature data 1p and per1 are extracted based on the prepared histogram (s40). In FIG. 7, a density histogram for a group of lines was produced so as to extract feature data 1p and per1 therefrom, but in this embodiment, a density value histogram is produced for each line so as to extract feature data from each of them.

Next, the feature data extracted for each line is used to calculate the mean values of the feature data 1p and per1 averaging the data of the line to be density-corrected and the several surrounding lines (s50). The mean values may be calculated by simply adding up each piece of feature data for the designated lines and dividing the result by the predetermined number, by averaging the data, discarding the minimum and maximum values of the feature data, or by other methods. Based on the thus averaged feature data 1p and per1, a density correction table as shown in FIG. 6 is selected in the same manner as in FIG. 7 (s6). In this selection, one of the density correction tables in FIG. 6 will be selected based on the extracted feature data. Alternatively, it is also possible to select a density correction table based on the range of the averaged feature data 1p and per1 and the density correction table for the previous line. This configuration makes it possible to avoid a transition from a correction scheme for one original feature to that for quite another feature, such as a transition from density correction table 7 to table 8, during the process of density correction. In this case, a multiple number of tables for density correction should be prepared for photographic originals and text originals, respectively so that the selection may be made from the respective groups.

In the above way, density correction of the input image data is performed for each line using the selected density correction table (s7), and if density correction for all the lines has not been completed, the operation returns to the first step s1, to repeat the aforementioned processing.

Concerning the density correction tables in the above operation, as already described when referring to FIG. 7, the three density correction tables 7 to 9 shown in FIG. 6 and a group of tables clustered around the three density correction tables, may and should be prepared. In this configuration, when the pair of averaged feature data 1p and per1 fall within the range in which the image is recognized as a text area, the selection of a density correction table for the current line is carried out by selecting the density table which is the closest one to the density correction table for the previous line, among the group of density correction tables having more defined features for text area than the density correction table for the previous line. In a similar manner, when the feature data fall within the range in which the image is recognized as a photographic area, the selection of a density correction table for the current line is carried out by selecting the density table which is the closest one to the density correction table for the previous line, among the group of density correction tables having more defined features for photographic area than the density correction table for the previous line. Further, when the pair of averaged feature data fall within the range in which the image is recognized as that in a colored background area, the selection of a density correction table for the current line is carried out by selecting the density table which is the closest one to the density correction table for the previous line, among the group of density correction tables having more defined features for colored background area than the density correction table for the previous line. Moreover, when the pair of the averaged feature data fall within the range in which the data is not distinct enough to determine which area the current line belongs to, the density correction table equivalent to that for the previous line may be selected as the density correction table for the current line.

In accordance with the embodiment described heretofore referring to FIG. 8, since one density correction table is selected for each line by properly recognizing the features of the line taking into account the information of the image data for a plurality of surrounding lines around the line in question, it is possible to perform an appropriate density correction for each line. Further, making calculation of the mean values of the extracted feature data for each line, can reduce the size of the feature extracting circuit compared to the case of FIG. 7.

Figure 9:
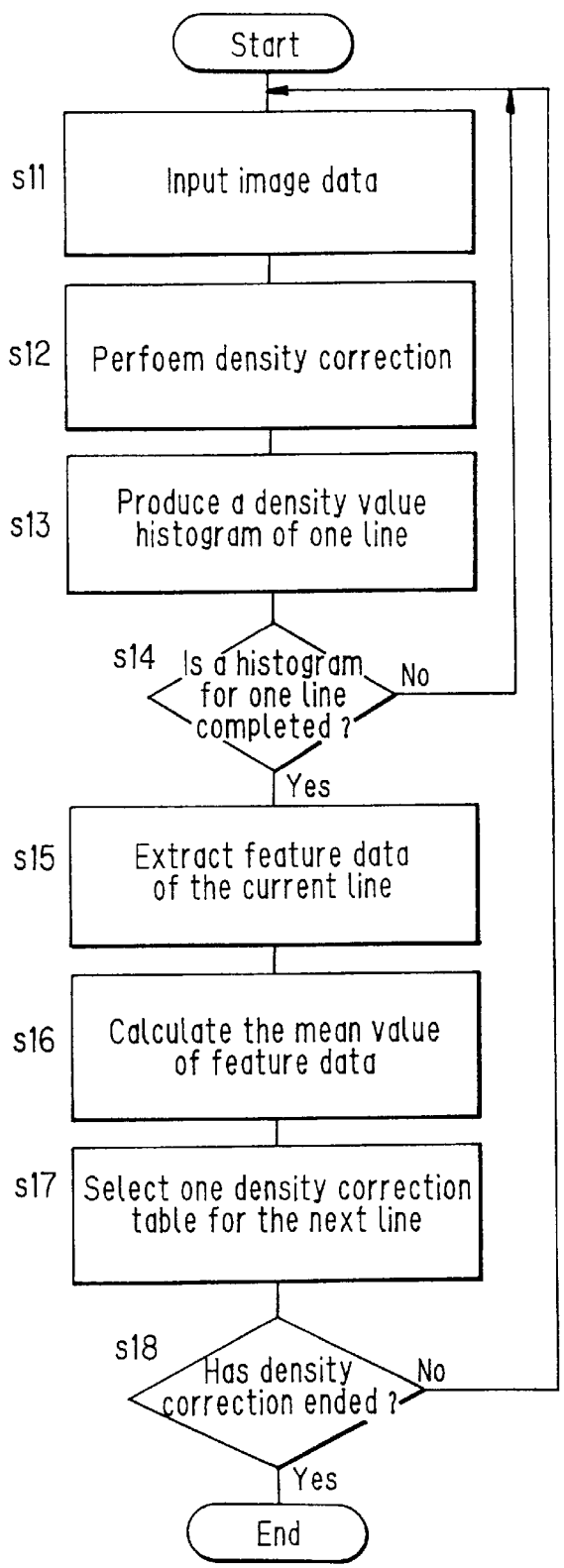
FIG. 9 is a flowchart showing still another mode of the density correction process of the image processing apparatus in the first embodiment of the invention.

FIG. 9 shows the flow of processing control in another variational mode of the first embodiment. This mode, differing from the configurations of FIGS. 7 and 8, makes density correction of the input image data by selecting a density correction table based on the feature data for the previous line before the line to be corrected.

Referring to FIG. 9, the input image data is stored line by line in memory 2. First, when the input of the image data for one line has been completed, the image data of the line just input are density-corrected (n12). This correction to the density is carried out based on the selected density correction table which will be described hereinbelow.

The input image data is used to create a density value histogram (s13). When the image input for one line and the production of its density value histogram have been completed, feature data 1p and per1 for the currently input line are extracted (s15). The extracted feature data 1p and per1 are used to obtain the mean values calculated from themselves and the feature data for the previous image data for a predetermined number of the lines before the line to be density-corrected. This means that extraction of the feature data of each line before the current line is carried out and, this feature data is averaged (s16).

Then, for density correction of the input image signal, one of density correction tables 7 to 9 shown in FIG. 6 is selected based on the mean values of this feature data. Alternatively, based on the mean values of the feature data and the density correction table for the previous line, one density correction table is selected (s17), and the image data to be input next (s11) is density-corrected (s12) using the selected table. Accordingly, since one density correction table has been selected at Step 17 when the image data which will be density-corrected is input from input terminal 1, the image data to be input can be directly density-corrected based on the selected density correction table.

Concerning the density correction tables in this operation, as already described, the three density correction tables 7 to 9 shown in FIG. 6 and a group of tables clustered around the three density correction tables, may and should be prepared. Upon the selection, the density correction table for the line prior to the one to be corrected is also considered as a selection target. The reason is the same as already described before.

In this way, the image processing shown in FIG. 9, when a density correction table is selected for each line, the features of the line are properly evaluated based on the information from the image data for several lines prior to the line. Hence it is possible to effect proper density correction for each line. Further, since the feature data is extracted based on the image data for several lines prior to the line to be corrected, memory 2 for storing several lines is not required.

However, since there are no lines upon which the density correction table for the first line is selected, the processor needs to have memory for at least one line. Therefore, for the first line, one density correction table needs to be selected by extracting feature data from the line itself and the density correction should be effected based on this selected table. From then on, it is possible to select a density correction table by averaging the feature data for a predetermined number of previous lines because the feature data is successively extracted.

The image processing or the density correcting process of the first embodiment described with reference to FIGS. 7 to 9, comprises the steps of: processing the image data of a predetermined number of surrounding lines around a line to be corrected so as to produce a density value histogram; extracting feature data 1p and per1 defined in this invention from the density value histogram; and selecting a density correction table. This procedural configuration enables density correction at the state where the conditions of the surrounding the line to be corrected are clearly captured.

Further, it is also possible to produce a density histogram based on a predetermined number of lines before or after (or before and after) the line to be corrected so as to extract feature data based on this histogram.

Next, description will be made on the second embodiment in which, in contrast to the embodiment described above, feature data is extracted for each piece of input image data, in particular, of each line so as to effect a density correction process based on the extracted features.

Second embodiment

As stated above, in this embodiment, whenever image data is input, it is density-corrected and the density-corrected data is output. Since digital copiers, scanners etc., having this feature can perform density correction of an original together with its scanning operation, it is no longer necessary to perform pre-scanning.

Figure 10:
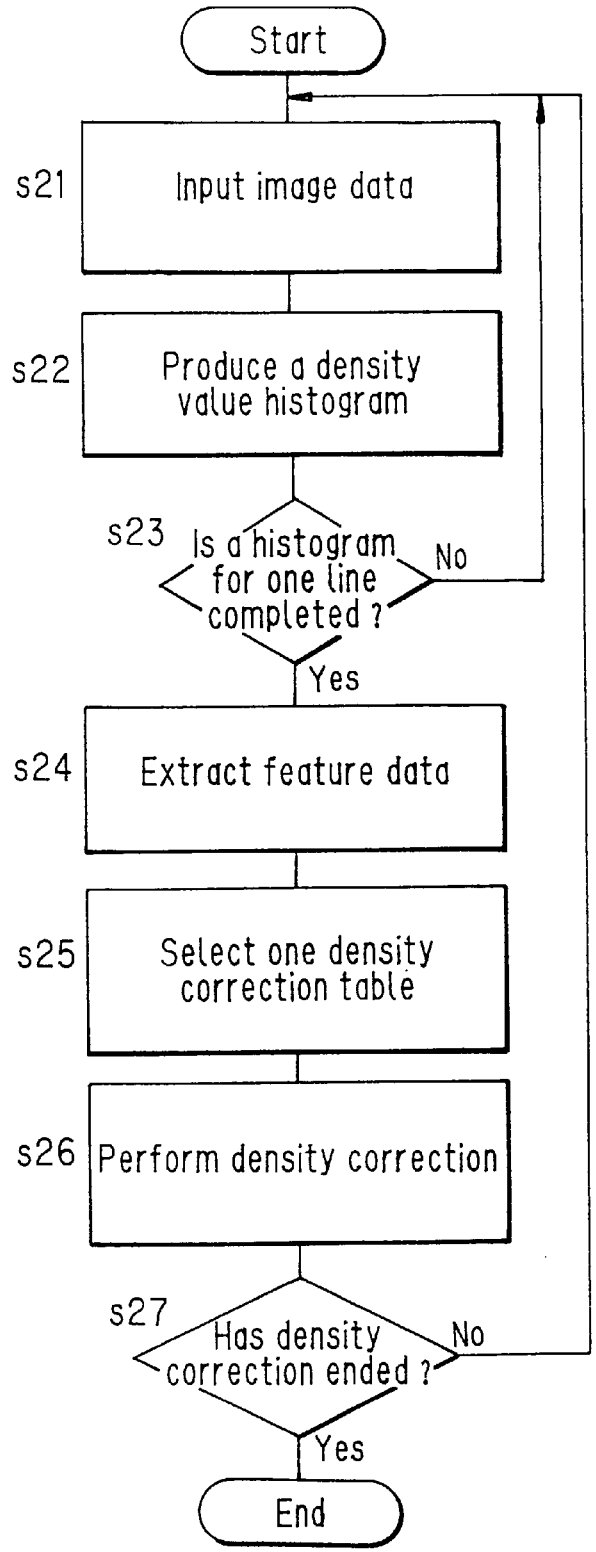
FIG. 10 is a flowchart showing a mode of the density correction process of the image processing apparatus in the second embodiment of the invention.

FIG. 10 is a flowchart showing a typical flow of the image processing. In FIG. 10, image data is successively input from input terminal 1 (s21) and each line being stored as a unit in memory 2. Feature data extracting circuit 3 produces a density value histogram for each line (s22). When input of the image data of one line is confirmed (s23), feature data extracting circuit 3 extracts feature data 1p and per1 (s24) from the density value histogram produced above. One of the density correction tables, for example, shown in FIG. 6 is selected, based on the feature data 1p and per1, or based on this feature data and the density correction table for the previous line (S25). Using the selected density correction table, the image data of the currently input line is density-corrected (s26).

Concerning the density correction tables in this operation, as already detailed in the first embodiment, the three density correction tables 7 to 9 shown in FIG. 6 and a group of tables clustered around the three density correction tables should be prepared. When the pair of feature data 1p and per1 fall within the range in which the image is recognized as a text area, the selection of a density correction table for the current line is carried out by selecting the density table which is the closest one to the density correction table for the previous line, among the group of density correction tables having more defined features for text area than the density correction table for the previous line.

On the other hand, when the pair of feature data 1p and per1 fall within the range in which the image is recognized as a photographic area, the selection of a density correction table for the current line is carried out by selecting the density table which is the closest one to the density correction table for the previous line, among the group of density correction tables having more defined features for photographic area than the density correction table for the previous line.

Further, when the pair of feature data 1p and per1 fall within the range in which the image is recognized as that in a colored background area, the selection of a density correction table for the current line is carried out by selecting the density table which is the closest one to the density correction table for the previous line, among the group of density correction tables having more defined features for colored background area than the density correction table for the previous line.

Here, when the extracted feature data 1p and per1 fall within the range in which the data is not distinct enough to determine which area the current line belongs to, the density correction table equivalent to that for the previous line may be selected for the density correction table for the current line.

In the above way, since the image data for only one line is stored in memory 2, to be used to properly recognize the features of the line based on the image data of the line for density correction so that a density correction table may be selected for every line, it is possible to achieve appropriate density correction for each line.

Next, description will be made of the image processing based on the flowchart shown in FIG. 11.

First, image data is input from input terminal 1 (s31) and subjected to density correction. Feature extracting circuit 3 produces a density value histogram for each line (s33). Before this, density correction of the input image data is carried out (s32). This density correction is effected using the density correcting table selected based on the feature data of the image data for the previous line.

Accordingly, after the input of the image data for one line has been completed (s34), the aforementioned feature data 1p and per1 are extracted based on the density value histogram produced in feature data extracting circuit 3. Then, a density correction table is selected based on feature data 1p and per1 for the line, and the density correction of the input image data is performed based on the selected table. Alternately, it is also possible to select a density correction table based on the feature data and the density correction table for the previous line, and then execute the density correction process using the table at Step s32.

Here, since a density correcting table has been selected when the image data to be density-corrected is input from terminal 1, it is possible to omit memory 2.

Concerning the density correction tables in this operation, as already described, the three density correction tables 7 to 9 shown in FIG. 6 and a group of tables clustered around the three density correction tables should be prepared, and a table which is the one closest to the density correction table for the previous line is selected based on the feature data 1p and per1. This process is the same as already described.

Figure 11:
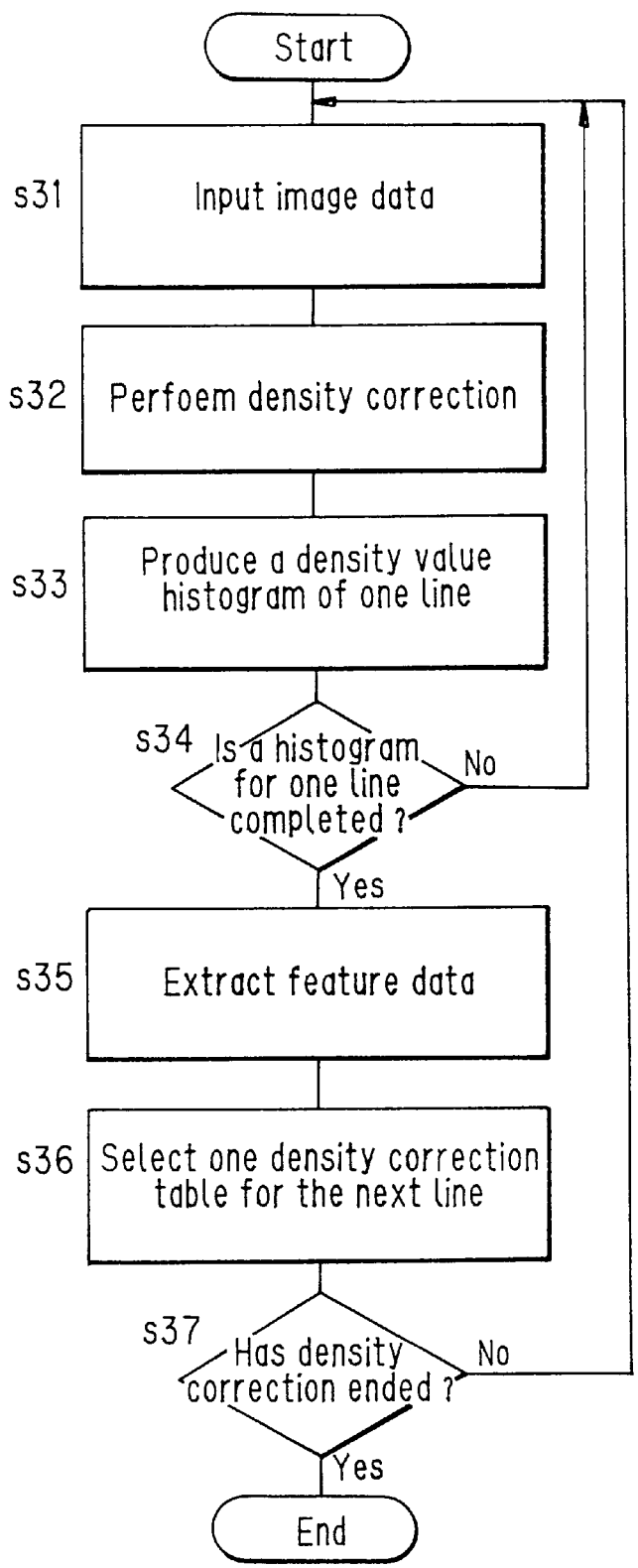
FIG. 11 is a flowchart showing another mode of the density correction process of the image processing apparatus in the second embodiment of the invention.

In accordance with the correcting process of the image density shown in FIG. 11, since a density correction table is selected for each line based on the features properly analyzed from, and based on, the image data of the line before density correction, the image data can be density-corrected appropriately line by line.

Another development of the invention

In the first and second embodiments, feature data extracting circuit 3 produces a density value histogram in accordance with the input image data, and extracts feature data 1p and per1 based on the produced histogram.

Feature data 1p is defined as the density value at which the distribution frequency of the prepared histogram becomes maximum (the number of pixels becomes maximum). A variety of examples for extracting feature data will be described hereinbelow.

As a method for extracting feature data from a density value histogram, a density value having a maximum distribution frequency within a range higher than a certain threshold density value (density value '100', for example) is extracted. If the distribution frequencies in the range higher than the threshold density value ('100') are all zero, feature data 1p is set at the density value ('100'), and the other piece of feature data per1 is set at '0'.

In general, in a text original, the proportion of the area occupied by its background is greater than that of the area occupied by text as shown in FIG. 3. However, there are some cases where a great number of characters are packed together or characters are written in thick and heavy type. In such a case the proportion of the area occupied by text may be greater than that of the area occupied by its background. This state is represented by a density value histogram shown in FIG. 12.

In accordance with the method described in the first and second embodiments, a density value 1p1 will be extracted as feature data 1p from the this histogram, resultantly, the original cannot be recognized as a text original, possibly causing erroneous recognition.

To avoid this, it is necessary to extract the density value having a maximum distribution frequency within a range higher than a density value of '100' as feature data 1p. When this is done, a density value 1p2 can be extracted as feature data 1p even from the histogram shown in FIG. 12. In this case, feature data per1 will be simply calculated from the following formula (2):

$$per1 = \sum_{k=1p-n}^{1p+n} hist[k] \bigg/ \left(\sum_{k=0}^{1p+n} hist[k]\right) \quad (2)$$

In the above way, in feature data extracting circuit 3, a density value having a maximum distribution frequency within the range higher than a density value of '100' is extracted as the feature data from the produced density value histogram and the thus extracted feature data is used for the selection of a density correction table as has been done in the first and second embodiment. Consequently, it is possible to faithfully interpret the type of original even when the original is a text original having the features shown by the histogram in FIG. 12, thus achieving reliable density correction without erroneously interpreting the features of the original.

Figure 13:
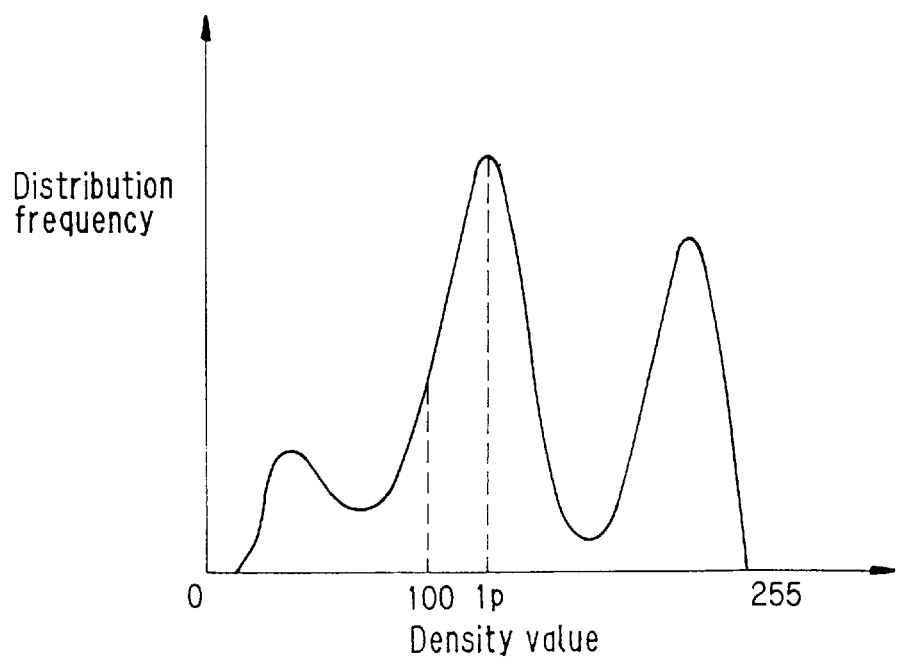
FIG. 13 is an illustrative chart showing another example of a density value histogram based on which feature data of the invention will be extracted.

Further, when an original is composed of white background areas and tonal or colored background areas, i.e., having paper patches with a colored background such as newspaper or green, blue, yellow or other colored paper, applied on a white sheet, this original will produce a density value histogram as shown in FIG. 13. In such a case, the central peak is extracted as feature data 1p while most of the image data of the white areas is discarded, and the thus extracted density value 1p is used to calculate per1 from formula (2). In this case, the value of the thus calculated feature data per1 is greater than that of the feature data per1 of a photographic original, so there is no risk of the feature data per1 becoming a small value and being erroneously interpreted as a photographic area. In this way, this case is recognized as an area with a tonal or colored background, without fail.

Next, description will be made of still another method which is different from the above-described extraction method of feature data 1p. Illustratively, in searching for density value 1p at which the distribution frequency becomes maximum in the density value histogram, the histogram is scanned from the side low in the density value level (from the side where the value is low) to locate the first appearing relative maximum in the distribution frequency of the density value histogram, and this density value is set as density value 1p. For the search for this relative maximum, a density value x0 which satisfies the following relation for the first time needs to be found:

hist[x₀+1]-hist[x₀]>0

Then, a density value x1 which is above x0 and satisfies the following relation for the first time needs to be found:

hist[x₁+1]-hist[x₁]<0

The thus obtained $x_1$ is set as feature data 1p.

Figure 14:
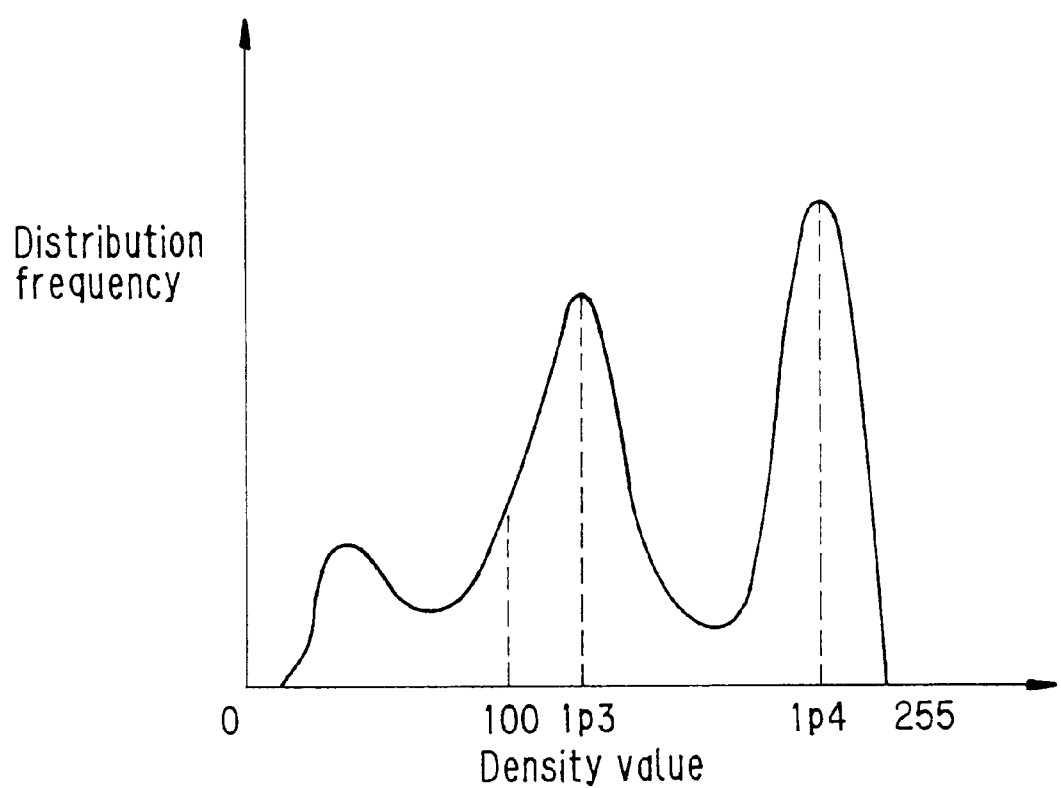
FIG. 14 is an illustrative chart showing still another example of a density value histogram based on which feature data of the invention will be extracted.

When an original which is composed of white background areas and colored background areas, i.e., having paper patches with a colored background such as newspaper, green, blue, yellow or other colored paper, applied on a white sheet, has a greater part of white background areas than that of colored background areas, the original will produce a density value histogram as shown in FIG. 14. By the above calculation, peak 1p3, instead of peak 1p4, is extracted as feature data 1p, thus the image data is recognized as colored background area.

By this configuration, text in the colored background portion can be density-corrected on the basis of the colored background portion, thus making it possible to achieve a more exact density correction. In this case, if density value 1p4 representing the white background portion is extracted as feature data, the reproduction will be lacking in fidelity because the text is density-corrected on the basis of the density of the white background.

The above extraction methods of feature data 1p are to achieve faithful density corrections for the cases of special originals. Normal originals will produce density value histograms shown in FIGS. 3 through 5, those which are typical.

On the other hand, in the aforementioned extraction of the feature data, the first appearing density value at which the distribution frequency which becomes relative maximum in the density value histogram is located so that it is set at density value 1p. Then, it is necessary to check whether there is any other relative maximum which is greater than the distribution frequency of the above density value 1p, within the range from value 1p to a certain density value greater than that. If the check shows a negative, the second feature data, i.e., per1 is determined (extracted) from formula (2) based on the value p1. If another value is found during the process of checking, this density value is set as renewed feature data 1p. This process will be repeated as long as new feature data 1p is extracted.

As in the above way, when there are a plurality of nearby peaks in the distribution frequency peaks in the density value histogram, the density value at which the distribution frequency becomes maximum in its surrounding is selected as density value 1p, thus making it possible to easily extract 1p as the density value having its frequency at a maximum and hence being considered to be the background.

In the density value histogram for extracting feature data 1p, if density values at which the distribution frequency erroneously becomes a maximum or a relative maximum are considered to be candidates for feature data extraction, erroneous cognition of the features of an original might occur. To avoid this, it is preferred that the prepared density value histogram is smoothened. This smoothening of the histogram is carried out by calculating the mean value or the summation of the distribution frequencies of a defined number of densities around each density value, and reconstructing a new, smoothened histogram using the calculated result as its distribution frequencies. This way of averaging is represented as the following formula (3) or (4).

$$hist'[n] = \sum_{k=n-m}^{n+m} hist[n]/(2m+1) \quad (3)$$

or $$hist'[n] = \sum_{k=n-m}^{n+m} hist[n] \quad (4)$$

Thus, since the shape of the histogram can be smoothened, it is possible to reduce the occurrence of the maximums or relative maximums due to errors, enhancing the correctness of feature data 1p, the density value representing the background. Concurrently, the second feature data per1 also becomes pertinent to representing the quotient of the image data corresponding to the background portion.

To sum up, the image processing apparatus of the invention described above, the configurations, operations and effects will be broken down hereinbelow.

The image processing apparatus of the invention includes a data extracting means which extracts feature data representing the density characteristics of an original from the image data which has been obtained by scanning the original; an image recognizing means which recognizes the features of the original based on the aforementioned feature data when it is supplied, and a density correcting means which has a number of density correction tables for converting the density values of the image data of the original into corrected density values in accordance with the features of the image of the original, and selects one density correction table corresponding to the image characteristics from the above density correction tables, based on the image recognition information from the image recognizing means, and performs density correction of the image data in conformity with the selected density correction table. In this configuration, the feature data is composed of a density value at which the distribution frequency in the image density value histogram becomes maximum and a quotient of the number of pixels relating to the maximum density value.

By the above configuration, which uses only two pieces of feature data, it is possible for the image recognizing means to distinguish a text original, photographic original, an original with a colored background such as newspaper or green, blue, yellow or other colored paper, based on simple criteria, thus making it possible to perform density correction in accordance with the type of each original.

In the above image processing apparatus, when selection of a density correction table by the density correcting means is adapted to be carried out based on the feature data extracted from the image data of the line to be density-corrected and its surrounding lines, or based on the feature data thus extracted and the density correction table of the line prior to the line to be density-corrected, it is possible to perform density correction taking into account the information of the image data of a multiple number of lines around each line. This characteristic enables pertinent recognition of features of the surrounding lines and allows a proper selection of a density correction table for each line, thus making it possible to effect appropriate density correction for each line.

In the above image processing apparatus, selection of a density correction table in the density correcting means is carried out by extracting feature data from the line to be density-corrected and each line of its surrounding lines, averaging the thus extracted feature data and selecting one density correction table based on the thus determined feature data. In this case, it is also possible to select a table by taking into account the density correction table for the line prior to that to be density-corrected. In this configuration it is also possible to take into account the information of the image data of a multiple number of lines around each line and recognize features of the line pertinently thus allowing selection of a density correction table for each line. It is also possible to perform pertinent density correction for each line. In this case, it is possible to reduce the size of the feature data extracting circuit by extracting feature data for each of lines and averaging these pieces of the extracted feature data.

Also in the above image processing apparatus, selection of a density correction table in the density correcting means is carried out by extracting feature data from each line of a group of lines prior to the line to be density-corrected and averaging the thus extracted pieces of the feature data and selecting one density correction table based on the thus determined feature data. Based on the thus selected density correction table, the image data is density-corrected. As a result, it is possible to evaluate line features appropriately so as to select one density correction table for each line, thus making it possible to achieve pertinent density correction for each line. The image data to be density-corrected can be density-corrected immediately after its input because the density correction table corresponding to the input data has been selected when the image data is input. This configuration enables reduction of the memory in which the image data is stored. For example, picked up data from an original in a digital copier can be density-corrected and output instantly, needing no preliminary scanning.

In the above image processing apparatus, selection of a density correction table in the density correction means is carried out based on the feature data of the line to be density-corrected. Alternatively, in the case where selection of a density correction table is adapted to be carried out by taking into account the density correction table for the previous line, when only the image data of one line is stored in memory, it is possible to properly recognize the features of the line based on the image data of the line to be density-corrected and select one density correction table for each line. As a result, pertinent density correction for each line can be carried out. Further, since each piece of the feature data is extracted from the image data for the line, the size of the feature data extracting circuit can be further reduced.

Further, in the above configuration of the image progressing apparatus, since selection of a density correction table in the density correction means is made by extracting feature data of the previous line upstream of the line to be density-corrected, the features of the image can be pertinently determined based on the image data of the line upstream of that to be density-corrected, thus making it possible to select a density correction table for each line. Hence, the image data can be density-corrected appropriately line by line. Further, since the feature data is extracted based on the image data of one line, it is possible to further reduce the size of the feature data extracting circuit. Moreover, since the image data to be density-corrected can be density-corrected immediately after its input, because the density correction table corresponding to the input data has been selected when the image data is input, this configuration enables reduction of the memory in which the image data is stored.

Figure 12:
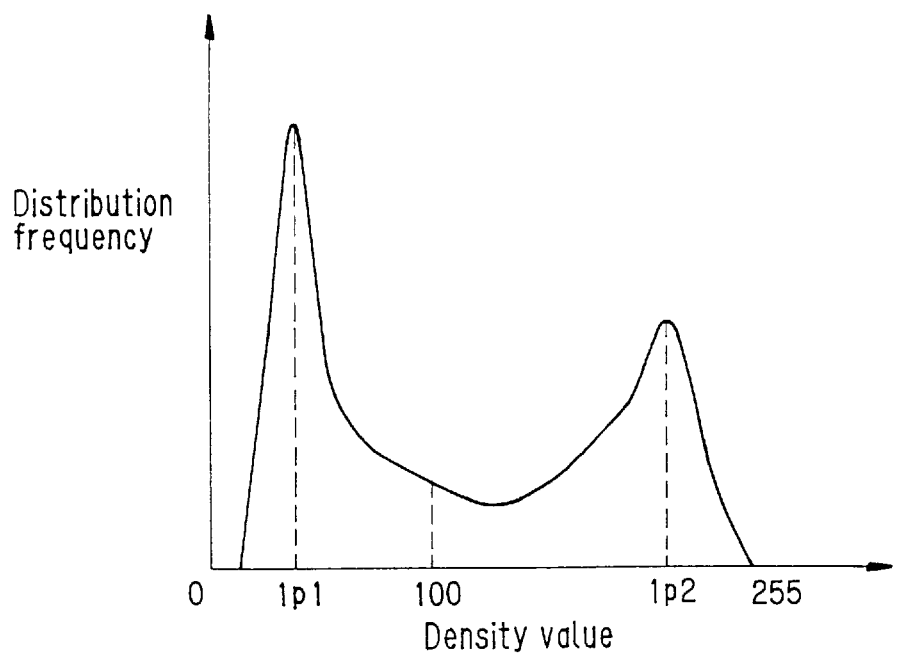
FIG. 12 is an illustrative chart showing an example of a density value histogram based on which feature data of the invention will be extracted.

In the above configuration of the image processing apparatus, a density value having a maximum distribution frequency in the density histogram of an image is extracted from a range higher than a certain threshold density value (density value '100', for example) as shown in FIG. 12. By this setting, it is possible to avoid the risk that the density value corresponding to the text portion is erroneously extracted as the feature data representing a typical density value of the background portion. Further, since the range in which the maximum frequency of the density value histogram will be searched for is limited to a smaller range, the processing speed can be increased.

Concerning the feature data relating to density value 1p at which the distribution frequency of the density value histogram of the image becomes maximum, the ratio of the number of the pixels residing within the range of 1p±n to the number of the pixels having a density value equal to 1p+n or below (the density value at which the distribution frequency of the density value histogram of the image becomes maximum plus n) is extracted as another piece of feature data. Therefore, when an original is composed of white background areas and colored background areas, i.e., having paper patches with a colored background such as newspaper or green, blue, yellow or other colored paper, applied on a white sheet and even when the density value of an area having the maximum distribution frequency in its density value histogram falls within the range of density values corresponding to the colored background area, and hence not falling within the range of density values corresponding to the white background area, the feature data (per1 calculated from formula (2)) extracted as a quotient (per1) of the image data corresponding to the background is calculated by discarding most of the image data of the white background area. As a result, there is little risk that the value of per1 will become small and be erroneously recognized as a photographic area. Thus, this area can be recognized as the colored background area.

In the extraction of the feature data in the image processing apparatus, when a density at which the distribution frequency of the density value histogram of an image become maximum is extracted, the histogram distribution is checked from, for example, a density value of '100' toward its higher values, so as to locate a density at which the distribution frequency in the density histogram forms a peak for the first time. The thus located density value is adapted to be used as the feature data in place of the density value having the maximum frequency in the density value histogram. By this configuration, it is possible to discard most of the image data of the white background area even when an original is composed of white background areas and colored background areas having paper patches with a colored background such as newspaper or green, blue, yellow or other colored paper, applied on a white sheet and the white background area is greater than the colored background area. As a result, there is little risk that the value of per1 will become small and be erroneously recognized as a photographic area. Thus, this area can be recognized as the colored background area. In addition, since, when the first relative maximum has been found, it is no longer necessary to check the range having greater density values than the density value of the relative maximum, it is possible to enhance the processing speed.

Further, in the extraction of the feature data in the image processing apparatus, when the first peak and another peak have been found within a certain range of density values from the density value corresponding to the first peak and if the latter peak is higher than the first peak, the higher value is set as the renewed first peak. In this case, if there are a plurality of nearby peaks in distribution frequency of a density value histogram, the density of a peak at which the distribution frequency becomes maximum among the surrounding peaks is extracted as the feature data. As a result, it is possible to extract the density value which is more suited to a typical density value representing the background as the feature data.

In the extraction of the feature data in the image processing apparatus, the feature data of an image, i.e., the maximum distribution frequency in the density value histogram, is extracted from the smoothened density value histogram. Since the shape of the histogram is smoothened, it is possible to reduce the occurrence of the maximum or relative maximums due to errors, allowing more pertinent extraction of the feature data. Thus, it is possible to improve the identifying accuracy of an original or area.

In accordance with the image processing apparatus of the invention, input image data which has been picked up from an original is density-corrected by extracting two types of feature data and selecting one density correction table from a group of them based on these pieces of data, hence it is possible to precisely recognize the features of the original and hence effect faithful density correction using a very simple circuit configuration.

Since the feature data can be extracted from a plurality of lines or a single line of image data, it is possible to capture the extract features of the image data surrounding the image data to be corrected. In addition, it is possible to quickly extract feature data representing characteristics of the original, the input image data can be density-corrected and output immediately, thus markedly increasing the processing speed.

What is claimed is:

1. An image processing apparatus comprising:

a feature data extracting means which extracts feature data representing the density characteristics of an original from the image data that has been obtained by scanning the original and recognizes the features of the original from the feature data thus extracted; and, a density correcting means which has a plurality of density correction tables for transforming the density values of the image data of the original into corrected density values in accordance with the features of the image of the original, and selects one density correction table from the density correction tables, based on the image recognition information of the original from the feature data extracting means, and performs density correction of the image data in conformity with the selected density correction table, wherein the extracted feature data is composed of the number of pixels within a predetermined range (+/−n) which includes the modal density value (1p), at which the distribution frequency in the image density value histogram becomes maximum, and a quotient (per1) of the total number of pixels relating to the modal density value, and based on the feature data, the feature data extracting means identifies the features of the original.

2. The image processing apparatus according to claim 1, wherein the feature data extracting means produces a density value histogram from the image data of a single line or a plurality of lines located before or after the line of image data to be density-corrected, and extracts a density value (1p) and a quotient (per1) as the feature data from the produced histogram so as to identify the features of the original.

3. The image processing apparatus according to claim 1, wherein the feature data extracting means produces a density value histogram of the image data of a line to be density-corrected, and extracts the modal density value (1p) and a quotient (per1) relating thereto based on the produced histogram so as to recognize the features of the original, and selects a density correction table based on the cognition result, and the density correcting means effects density correction of the image data of the line to be density-corrected based on the selected density correction table.

4. The image processing apparatus according to claim 1, wherein in extraction of the modal density value in the produced density value histogram of an image, the feature data extracting means extracts a density value occurring most frequently in the density value histogram, from a range having density values more than a certain density value.

5. The image processing apparatus according to claim 4, wherein an averaged density value histogram produced from the originally obtained density value histogram of the image is used in the feature data extraction means when it extracts the density value occurring most frequently, the modal density value.

6. The image processing apparatus according to claim 1, wherein an averaged density value histogram produced from the originally obtained density value histogram of the image is used in the feature data extraction means when it extracts the density value occurring most frequently, the modal density value.

7. The image processing apparatus according to claim 1, wherein:

the feature data frequency in the density value histogram forms a first peak as a specific density value is checked toward its higher side.

8. The image processing apparatus according to claim 1, wherein:

when the first peak and another peak have been found within a certain range of density values from the density value corresponding to the first peak, and if the latter peak is higher than the first peak, the higher value is set as the renewed first peak.

9. An image processing apparatus comprising:

a feature data extracting means which extracts feature data representing the density characteristics of an original from the image data that has been obtained by scanning the original and recognizes the features of the original from the feature data thus extracted; and, a density correcting means which has a plurality of density correction tables for transforming the density values of the image data of the original into corrected density values in accordance with the features of the image of the original, and selects one density correction table from the density correction tables, based on the image recognition information of the original from the feature data extracting means, and performs density correction of the image data in conformity with the selected density correction table, wherein the extracted feature data is composed of the modal density value (1p), at which the distribution frequency in the image density value histogram becomes maximum, and a quotient (per1) of the number of pixels relating to the modal density value, and based on the feature data, the feature data extracting means identifies the features of the original, and wherein the selection of a density correction table in the density correcting means is made based on the extracted feature data and the density correction table for the previous line which has been density-corrected.

* * * * *